United States Patent
Gardynik et al.

(10) Patent No.: US 11,607,933 B2
(45) Date of Patent: Mar. 21, 2023

(54) AUTOMOTIVE PANEL HEM STABILIZING ASSEMBLY AND METHOD

(71) Applicant: Ford Global Technologies, LLC, Dearborn, MI (US)

(72) Inventors: Michael J Gardynik, Farmington Hills, MI (US); Steven Frank, Dearborn, MI (US); Kevin Joseph Favero, Plymouth, MI (US); Michael Joseph Lee, Ann Arbor, MI (US); Ronald Machin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 499 days.

(21) Appl. No.: 16/689,487

(22) Filed: Nov. 20, 2019

(65) Prior Publication Data

US 2021/0146759 A1 May 20, 2021

(51) Int. Cl.
*B60J 5/04* (2006.01)
*B21D 39/02* (2006.01)

(52) U.S. Cl.
CPC .......... *B60J 5/0463* (2013.01); *B21D 39/021* (2013.01); *B60J 5/0413* (2013.01); *B60J 5/0415* (2013.01); *B60J 5/0469* (2013.01)

(58) Field of Classification Search
CPC ...... B60J 5/0463; B60J 5/0413; B60J 5/0415; B60J 5/0469; B21D 39/021; B21D 39/026; F16B 1/006; Y10T 403/472
See application file for complete search history.

(56) References Cited

U.S. PATENT DOCUMENTS

| | | | |
|---|---|---|---|
| 3,861,339 A | 1/1975 | Aida et al. | |
| 6,528,176 B1 * | 3/2003 | Asai | B21D 39/021 29/521 |
| 7,241,073 B2 * | 7/2007 | Miller | F16B 5/0096 29/243.58 |
| 8,087,720 B2 | 1/2012 | Wang | |
| 2010/0072785 A1 * | 3/2010 | Wang | B62D 27/026 296/193.11 |
| 2012/0308910 A1 * | 12/2012 | Morris | H01M 8/0271 429/514 |
| 2014/0255088 A1 | 9/2014 | Drazic | |
| 2016/0009319 A1 * | 1/2016 | Langendorf | B23K 11/34 228/173.6 |
| 2016/0200182 A1 | 7/2016 | Ogawa et al. | |
| 2019/0143390 A1 * | 5/2019 | Yamamoto | B60J 5/0469 403/285 |
| 2019/0160513 A1 * | 5/2019 | Koch | B32B 37/1207 |
| 2019/0176590 A1 * | 6/2019 | Choi | B60J 5/0469 |

* cited by examiner

*Primary Examiner* — Sarang Afzali
*Assistant Examiner* — Darrell C Ford
(74) *Attorney, Agent, or Firm* — Vichit Chea; Carlson, Gaskey & Olds, P.C.

(57) ABSTRACT

An automotive panel assembly according to an exemplary aspect of the present disclosure includes a first panel, a second panel, and a flange of the first panel folded over an edge region of the second panel to hem together the first and second panels. The flange of the first panel includes a textured geometry that interlocks with a textured geometry of the edge region.

1 Claim, 3 Drawing Sheets

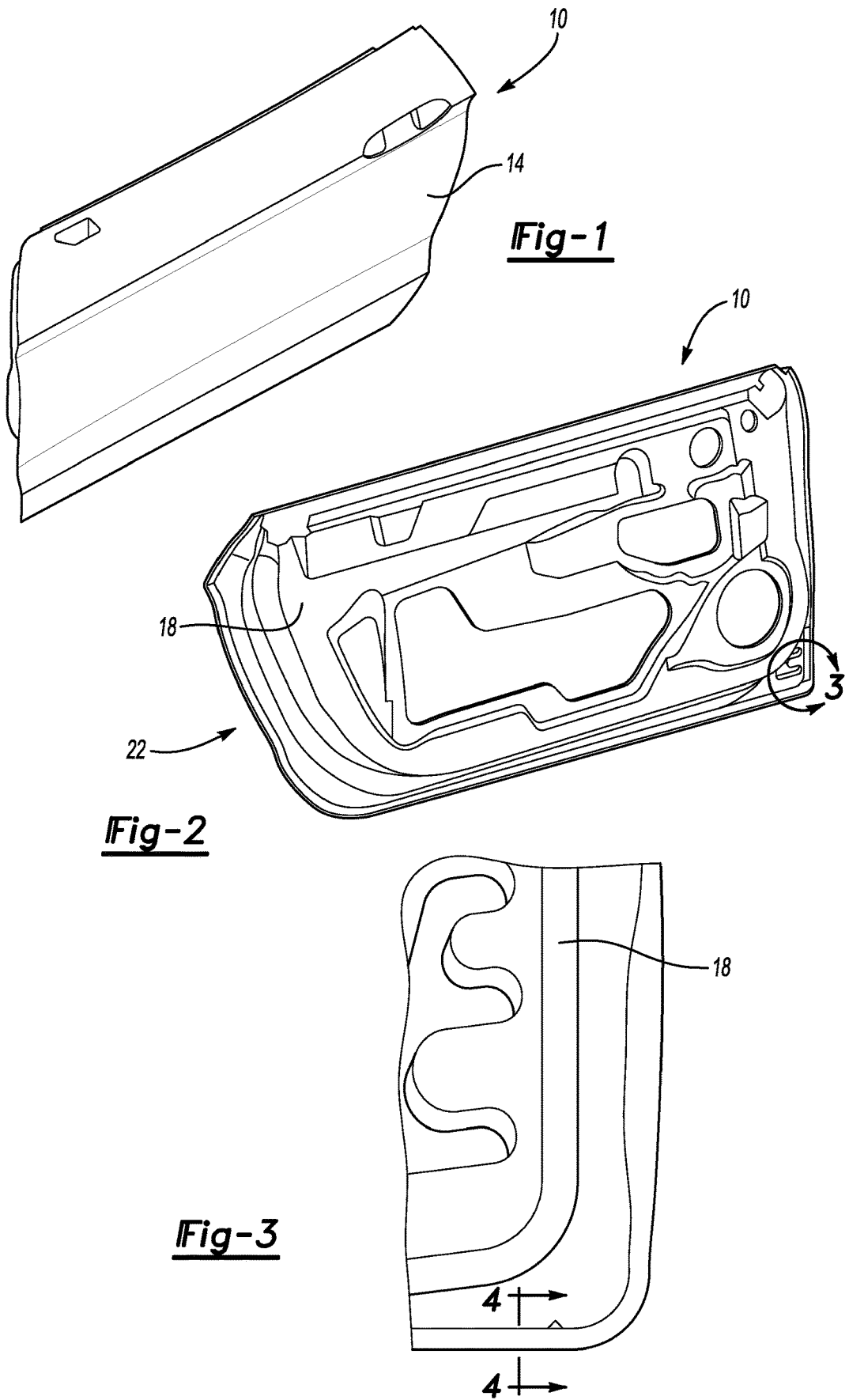

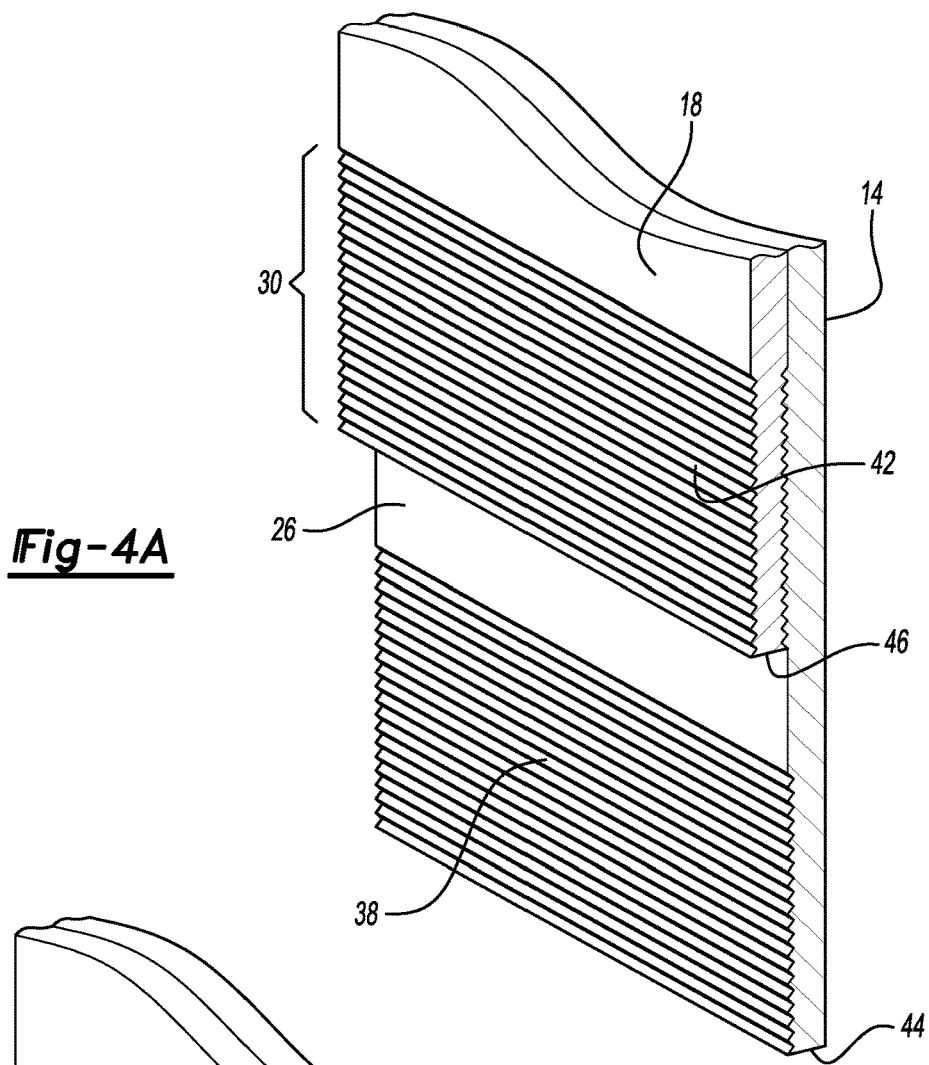
Fig-4A
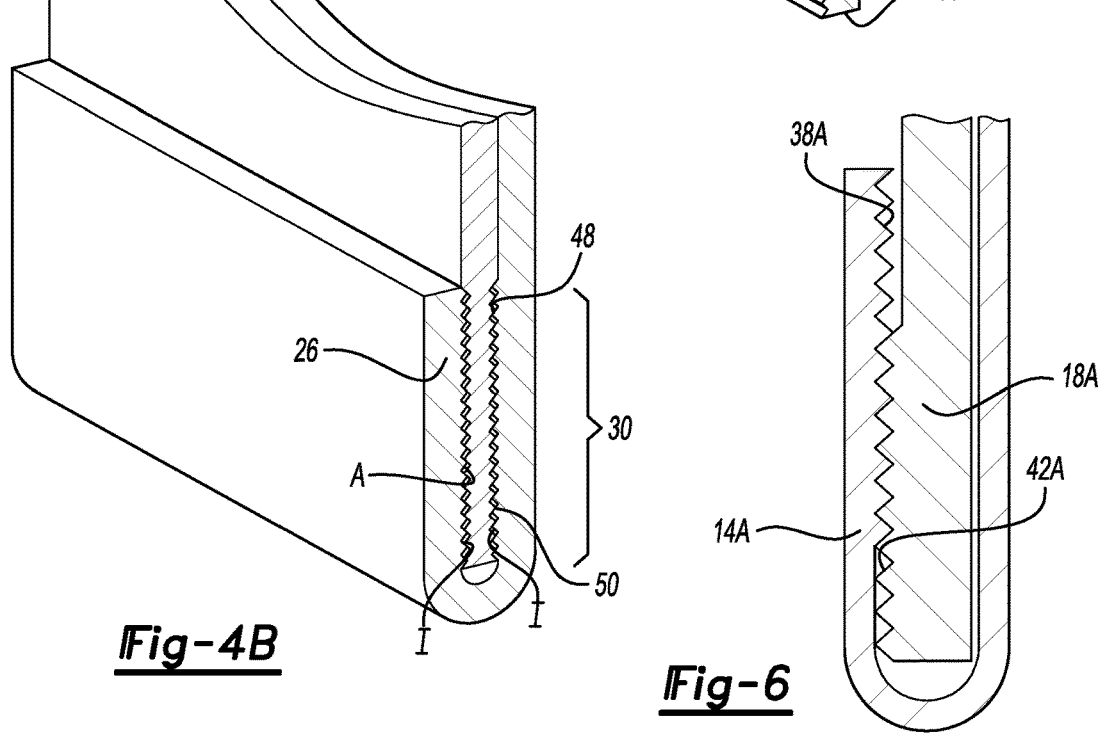
Fig-4B
Fig-6

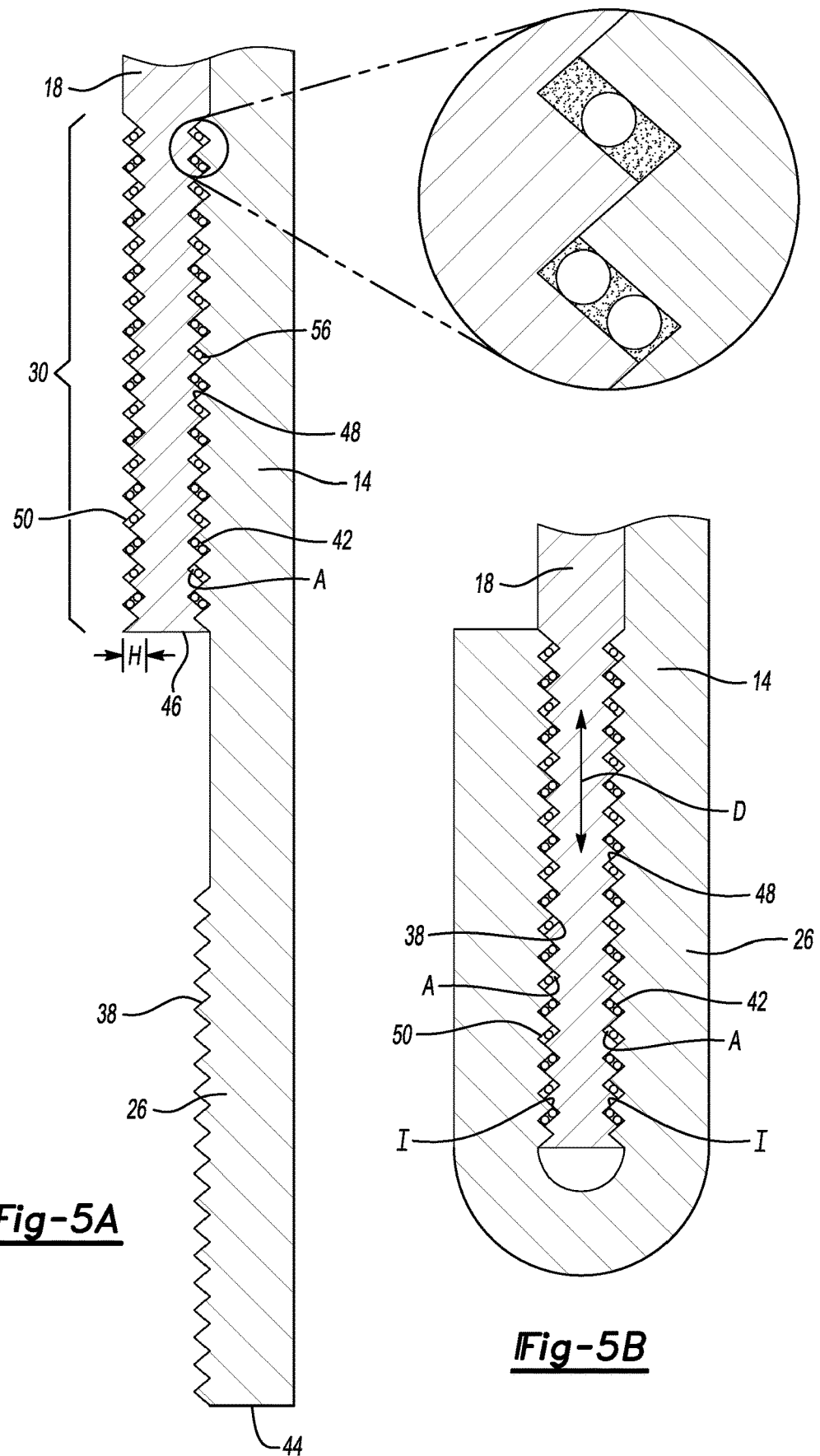

US 11,607,933 B2

AUTOMOTIVE PANEL HEM STABILIZING ASSEMBLY AND METHOD

TECHNICAL FIELD

This disclosure relates generally to hemming of an automotive panel assembly and, more particularly, to stabilizing hemmed areas when securing a first panel relative to a second panel.

BACKGROUND

An automotive panel assembly can include hemmed areas. After hemming, the automotive panel assembly can include a first panel folded over an edge of a second panel to couple together the first and second panels. Exemplary automotive panel assemblies can include body panels and closure panels, such as side doors, decklids, trunks, and hoods.

SUMMARY

An automotive panel assembly according to an exemplary aspect of the present disclosure includes a first panel, a second panel, and a flange of the first panel folded over an edge region of the second panel to hem together the first and second panels. The flange of the first panel includes a textured geometry that interlocks with a textured geometry of the edge region.

Another example of the foregoing assembly includes an adhesive that secures the flange of the first panel to the edge region of the second panel.

Another example of any of the foregoing assemblies includes a plurality of spacer features disposed within the adhesive and configured to keep areas of the flange spaced from areas of the edge region to accommodate adhesive.

In another example of any of the foregoing assemblies, the plurality of spacer features are glass spheres.

In another example of any of the foregoing assemblies, the textured geometry of the first panel has a total area and the textured geometry of the edge region has a total area. Further, from fifty to one-hundred percent of the total area of the textured geometry of first panel overlaps the textured geometry of the edge region.

In another example of any of the foregoing assemblies, the textured geometry of the edge region is on a first side of the edge region, and the edge region further includes a textured geometry on an opposite second side of the edge region that interlocks with the textured geometry of the first panel.

In another example of any of the foregoing assemblies, the textured geometry of the first panel is a scraped surface of the first panel. Also, the textured geometry of the edge region is a scraped surface of the edge region.

In another example of any of the foregoing assemblies, the textured geometry of the first panel interlocks with the textured geometry of the second panel without materially deforming the textured geometry of the first panel or the textured geometry of the second panel.

In another example of any of the foregoing assemblies, the textured geometry of the first panel includes a plurality of grooves and a plurality of ridges. The grooves and ridges extend longitudinally in a direction that is parallel to a side edge of the first panel.

In another example of any of the foregoing assemblies, the textured geometry of the second panel includes a plurality of grooves and a plurality of ridges. The grooves and ridges of the second panel extend longitudinally in a direction that is parallel to a side edge of the second panel.

In another example of any of the foregoing assemblies, the first panel is an outer panel and the second panel is an inner panel.

In another example of any of the foregoing assemblies, the outer panel is an outer door panel and the inner panel is an inner door panel.

In another example of any of the foregoing assemblies, a vehicle includes the automotive panel assembly.

An automotive panel hemming method according to yet another exemplary aspect of the present disclosure includes, among other things, folding a flange of a first panel over an edge region of a second panel, and interlocking a textured geometry of the flange with a textured geometry of the edge region.

Another example of the foregoing automotive panel hemming method includes, after the interlocking, curing an adhesive to hold the first panel relative to the second panel.

Another example of any of the foregoing automotive panel hemming methods includes, during the curing, keeping areas of the flange spaced from areas of the edge region using a plurality of spacer features.

In another example of any of the foregoing automotive panel hemming methods, the plurality of spacer features are glass spheres.

In another example of any of the foregoing automotive panel hemming methods, the textured geometry of the edge region is on a first side of the edge region, and the edge region further includes a textured geometry on an opposite second side of the edge region that interlocks with the textured geometry of the first panel.

Another example of any of the foregoing automotive panel hemming methods includes scraping the first panel to provide the textured geometry of the first panel, and scraping the edge region to provide the textured geometry of the edge region.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a perspective view of an outer panel of an automotive panel assembly.

FIG. 2 illustrates a perspective view of an inner panel hemmed together with the outer panel of FIG. 1.

FIG. 3 illustrates a close-up view of Area 3 in FIG. 2.

FIG. 4A illustrates a section view taken at line 4-4 in FIG. 3 during an early stage of hemming together the outer panel and the inner panel of FIGS. 1 and 2.

FIG. 4B illustrates the section view of FIG. 4A after hemming together the inner panel and outer panel.

FIG. 5A illustrates an end view of the portions of the inner panel and the outer panel shown in FIG. 4A.

FIG. 5B illustrates an end view of the portions of the inner panel and the outer panel shown in FIG. 4B.

FIG. 6 illustrates an end view of an inner panel and an outer panel hemmed together with interlocking textured surfaces according to another exemplary aspect of the present disclosure.

DETAILED DESCRIPTION

This disclosure relates generally to hemming an automotive panel assembly. In particular, the disclosure is directed toward stabilizing a first panel relative to a second panel during a hemming process. The stabilizing can give an adhesive time to cure.

Referring to FIGS. 1 and 2, an automotive panel assembly 10, here a side door of a vehicle, includes a first, outer panel 14 and a second, inner panel 18. The side door is considered a closure panel. In another example, the automotive panel assembly 10 could be another type of closure panel for the vehicle, such as a decklid, a trunk, or a hood. In still other examples, the automotive panel assembly 10 could be a body panel of a vehicle, such as a quarter panel, side panel.

The outer panel 14 and the inner panel 18 are secured together via a hem joint 22. In the exemplary embodiment, the hem joint 22 extends substantially continuously about a periphery of the automotive panel assembly 10. The hem joint 22, however, does not need to extend substantially continuously about the entire periphery. The hem joint 22 could, for example, extend only about a portion of the periphery.

With reference now to FIGS. 3-5B, the hem joint 22, in the exemplary embodiment, is disposed at a bottom forward edge of the automotive panel assembly 10. The hem joint 22 includes a flange 26 of the outer panel 14 folded over an edge region 30 of the inner panel 18. Folding the flange 26 over the edge region 30 captures the edge region 30 between the flange 26 and another portion of the outer panel 14.

When in the final hemmed position (FIGS. 4B and 5B), adhesive A between the edge region 30 and the outer panel 14 holds the hem joint 22 together. The adhesive A can be a thermoset adhesive that is cured when the automotive panel assembly 10 exposed to a relatively high temperature environment, such as during a painting step of the assembly process. The adhesive A can be placed along interfaces I.

Until the adhesive A cures, the adhesive A may act as a lubricant, which can potentially facilitate movement of the inner panel 18 relative to the outer panel 14 back and forth in a direction D (FIG. 5B). As can be appreciated, such relative movement may lead to misalignment between the inner panel 18 and the outer panel 14, particularly in the areas of the hem joint 22. Further, if the inner panel 18 and outer panel 14 are misaligned, the adhesive A may then cure and undesirably hold the inner panel 18 and the outer panel 14 in a misaligned position.

The exemplary embodiment incorporates a textured geometry 38 within the flange 26 of the outer panel 14. The textured geometry 38 interlocks with a textured geometry 42 of the edge region 30. Interlocking the textured geometry 38 with the textured geometry 42 can reduce or eliminate relative movement in the direction D prior to the adhesive A at the interfaces I curing.

In the exemplary embodiment, the textured geometry 38 includes a plurality of ridges R and grooves G running generally parallel to a side edge 44 of the outer panel 14. Also, the textured geometry 42 includes a plurality of ridges R and grooves G running generally parallel to a side edge 46 of the inner panel 18. Interlocking, for purposes of this disclosure, means that at least some of the ridges R of the outer panel 14 are at least partially received within grooves G of the inner panel 18, that some of the ridges R of the inner panel 18 are at least partially received within grooves G of the outer panel 14, or both. The receipt of ridges R of one of the textured geometries 38 or 42 within the grooves G of the other of the textured geometries 38 or 42 can limit movement of the inner panel 18 relative to the outer panel 14 in the direct D. The interlocking can occur without material deformation of the ridges R or the grooves R.

In addition to the textured geometry 38 interlocking with the textured geometry 42 in the edge region, the other portion of the outer panel 14 can include a textured geometry 48 that interlocks with a textured geometry 50 on the edge region 30. Using the additional interlocking textured geometries 48 and 50 can further facilitate reducing or eliminating the propensity for relative movement in the direction D between the inner panel 18 and the outer panel 14 prior to the adhesive curing.

In the exemplary embodiment, the textured geometry 42 is on a first side of the edge region 30. The textured geometry 50 is on an opposite, second side of the edge region 30.

To block the textured geometries 48 and 50 and the textured geometries 38 and 42 from squeezing adhesive A away from the interfaces I, the exemplary adhesive A includes a plurality of spacer features 56 distributed throughout. The spacer features 56 can block the flange 26 and the other area of the outer panel 14 from pressing against the edge region 30 so tightly that the adhesive A is squeezed out of the interfaces I. The spacer features 56 can be substantially non-compressible during the hemming process. In an exemplary embodiment, the spacer features 56 are glass spheres that are distributed within, and applied together with, the adhesive A.

The spacer features 56 maintain a relatively small gap or spacing between the outer panel 14 and the inner panel 18 after the folding of the flange 26 during the hemming. At least some of the adhesive stays within the gap until the adhesive A cures.

In the past, areas of panels that will interface together after hemming have been cast, and cast to include geometric features. The textured geometries in exemplary embodiments of the present disclosure differ from such cast geometric features due to, among other things, the textured geometries 38, 42, 48, and 50 being formed by scraping of the outer panel 14 or the inner panel 18. The scraping is referred to as scoring in some example. During scraping, some material is removed.

The textured geometries 38 and 48 in the outer panel 14 could instead be formed by one or more rolling operations, or one or more stamping operations. Similarly, the textured geometries 42 and 50 in the edged region could be formed by one or more rolling operations or one or more stamping operations.

The textured geometries 38, 42, 48, and 50 are thus provided by a secondary operation and are not cast.

Further, the textured geometries 38, 42, 48, and 50 extend parallel to the respective side edges 44 and 46. The textured geometries 38, 42, 48, and 50 can thus interlock without substantial material deformation. In some examples, if the 38, 42, 48, and 50 instead extended longitudinally in directions transverse to the side edges 44 and 46, the textured geometries 38, 42, 48, and 50 would not interlock to block relative movement of the outer panel 14 and the inner panel 18 in the direction D.

In the exemplary embodiment, the textured geometries 38, 42, 48, and 50 have a height, which corresponds to a distance D between a lowest point and a highest point of the textured geometries 38, 42, 48, and 50. An exemplary height H is shown in FIG. 5A in connection with the textured geometry 42.

In the exemplary embodiment, the textured geometry 38 overlaps 100 percent of the textured geometry 42. As shown in FIG. 6, in another example, a textured geometry 38A of an outer panel 14A overlaps only about 50 percent of a textured geometry 42A in an inner panel 128A. Other amounts of overlap are possible in other examples. One ridge R received within a single groove G may be enough to block relative movement in some examples.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An automotive panel assembly, comprising:

a first panel;

a second panel; and an adhesive that secures a flange of the first panel to an edge region of the second panel, the flange of the first panel folded over the edge region of the second panel to hem together the first panel and the second panel, the flange of the first panel including a textured geometry that interlocks with a textured geometry of the edge region of the second panel, wherein the textured geometry of the first panel includes a plurality of grooves and a plurality of ridges, the plurality of grooves and the plurality of ridges extending longitudinally in a direction that is parallel to a side edge of the first panel, and wherein a portion of the textured geometry of the flange of the first panel is in direct contact with the textured geometry of the edge region of the second panel and another portion of the textured geometry of the flange of the first panel is separated from the textured geometry of the edge region of the second panel by the adhesive.

* * * * *